United States Patent
Zhou et al.

(10) Patent No.: US 10,089,196 B2
(45) Date of Patent: Oct. 2, 2018

(54) METHODS FOR RECONFIGURING A STORAGE CONTROLLER WHEN CONTROL LOGIC FAILS AND APPARATUSES USING THE SAME

(71) Applicant: Shannon Systems Ltd., Shanghai (CN)

(72) Inventors: Zhen Zhou, Shanghai (CN); Xueshi Yang, Cupertino, CA (US)

(73) Assignee: SHANNON SYSTEMS LTD., Shanghai (CN)

( * ) Notice: Subject to any disclaimer, the term of this patent is extended or adjusted under 35 U.S.C. 154(b) by 153 days.

(21) Appl. No.: 15/208,654

(22) Filed: Jul. 13, 2016

(65) Prior Publication Data

US 2017/0017556 A1   Jan. 19, 2017

(30) Foreign Application Priority Data

Jul. 14, 2015   (CN) .......................... 2015 1 0411607
Nov. 4, 2015   (CN) .......................... 2015 1 0740155

(51) Int. Cl.
*G06F 11/20*   (2006.01)
*G06F 11/10*   (2006.01)

(52) U.S. Cl.
CPC ........ *G06F 11/2017* (2013.01); *G06F 11/104* (2013.01); *G06F 11/1004* (2013.01)

(58) Field of Classification Search
CPC .. G06F 11/20; G06F 11/2017; G06F 11/1004; G06F 11/104
USPC ....................................................... 714/5.11
See application file for complete search history.

(56) References Cited

U.S. PATENT DOCUMENTS

| | | | | |
|---|---|---|---|---|
| 5,381,544 A | * | 1/1995 | Okazawa | G06F 12/0802 711/E12.017 |
| 5,437,022 A | * | 7/1995 | Beardsley | G06F 11/1666 711/120 |
| 6,343,324 B1 | * | 1/2002 | Hubis | G06F 3/0622 709/229 |
| 7,036,059 B1 | * | 4/2006 | Carmichael | G06F 11/1004 714/725 |
| 7,346,674 B1 | * | 3/2008 | Gallagher | G06F 1/181 398/167 |
| 8,443,230 B1 | * | 5/2013 | James-Roxby | G06F 11/1683 714/11 |
| 8,443,263 B2 | | 5/2013 | Selinger et al. | |

(Continued)

FOREIGN PATENT DOCUMENTS

| | | |
|---|---|---|
| CN | 101800071 | 8/2010 |
| CN | 103942114 | 7/2014 |

(Continued)

OTHER PUBLICATIONS

Bolchini, C., et al.; "SEU Mitigation for SRAM-Based FPGAs through Dynamic Partial Reconfiguration;" Mar. 2007; pp. 1-6.

*Primary Examiner* — Kamini B Patel
(74) *Attorney, Agent, or Firm* — McClure, Qualey & Rodack, LLP

(57) ABSTRACT

A method for processing return entities associated with multiple requests in a single ISR (Interrupt Service Routine) thread, performed by one core of a processing unit of a host device, is introduced. Entities are removed from a queue, which are associated with commands issued to a storage device, and the removed entities are processed until a condition is satisfied.

24 Claims, 7 Drawing Sheets

(56) References Cited

U.S. PATENT DOCUMENTS

| | | | |
|---|---|---|---|
| 8,686,753 B1* | 4/2014 | Herrmann | H03K 19/17756 |
| | | | 326/16 |
| 2006/0020774 A1* | 1/2006 | Ramos | G06F 13/4217 |
| | | | 712/226 |
| 2008/0313312 A1* | 12/2008 | Flynn | G06F 1/183 |
| | | | 709/221 |
| 2010/0205517 A1 | 8/2010 | Lee et al. | |
| 2013/0138911 A1* | 5/2013 | Gopalakrishnan | |
| | | | G06F 12/0646 |
| | | | 711/170 |
| 2014/0082261 A1 | 3/2014 | Cohen et al. | |
| 2014/0189421 A1 | 7/2014 | Werner et al. | |
| 2014/0189427 A1 | 7/2014 | Bharadwaj et al. | |
| 2015/0234599 A1 | 8/2015 | Cohen | |
| 2016/0275017 A1* | 9/2016 | Takeda | G06F 1/3275 |

FOREIGN PATENT DOCUMENTS

| | | |
|---|---|---|
| TW | 201135746 | 10/2011 |
| TW | 201432702 | 8/2014 |

\* cited by examiner

METHODS FOR RECONFIGURING A STORAGE CONTROLLER WHEN CONTROL LOGIC FAILS AND APPARATUSES USING THE SAME

CROSS REFERENCE TO RELATED APPLICATIONS

This application claims the benefit of China Patent Applications No. 201510411607.3, filed on Jul. 14, 2015, and No. 201510740155.3, filed on Nov. 4, 2015, the entirety of which is incorporated by reference herein.

BACKGROUND

Technical Field

The present invention relates to flash memory, and in particular to methods for reconfiguring a storage controller when control logic fails, and apparatuses using the same.

Description of the Related Art

A SEU (Single Event Upset) is one of the reasons causing logic error in a control unit of an SSD (Solid State Disk) storage system encapsulated in FPGA (Field-Programmable Gate Array). The SEU is a change of state caused by alpha-ions or electromagnetic radiation striking a sensitive node of a micro-electronic device. Accordingly, what is needed are methods for reconfiguring a storage controller when control logic fails, and apparatuses using the same.

BRIEF SUMMARY

An embodiment of a method for reconfiguring a storage controller when control logic fails, performed by a processing unit of a host device, is introduced. An access of the storage controller is suspended when it is determined that the storage controller has failed. Reconfiguration control logic of a fixed region of the storage controller is directed to reprogram a whole reconfigurable region of the storage controller. After that, the access of the storage controller is resumed.

An embodiment of an apparatus for reconfiguring a storage controller when control logic fails is introduced. The apparatus at least contains a fixed region and a reconfigurable region. The fixed region at least contains a processing unit and reconfiguration control logic. The processing unit directs the reconfiguration control logic of the fixed region of the storage controller to reprogram the whole reconfigurable region of the storage controller after determining that the storage controller has failed.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
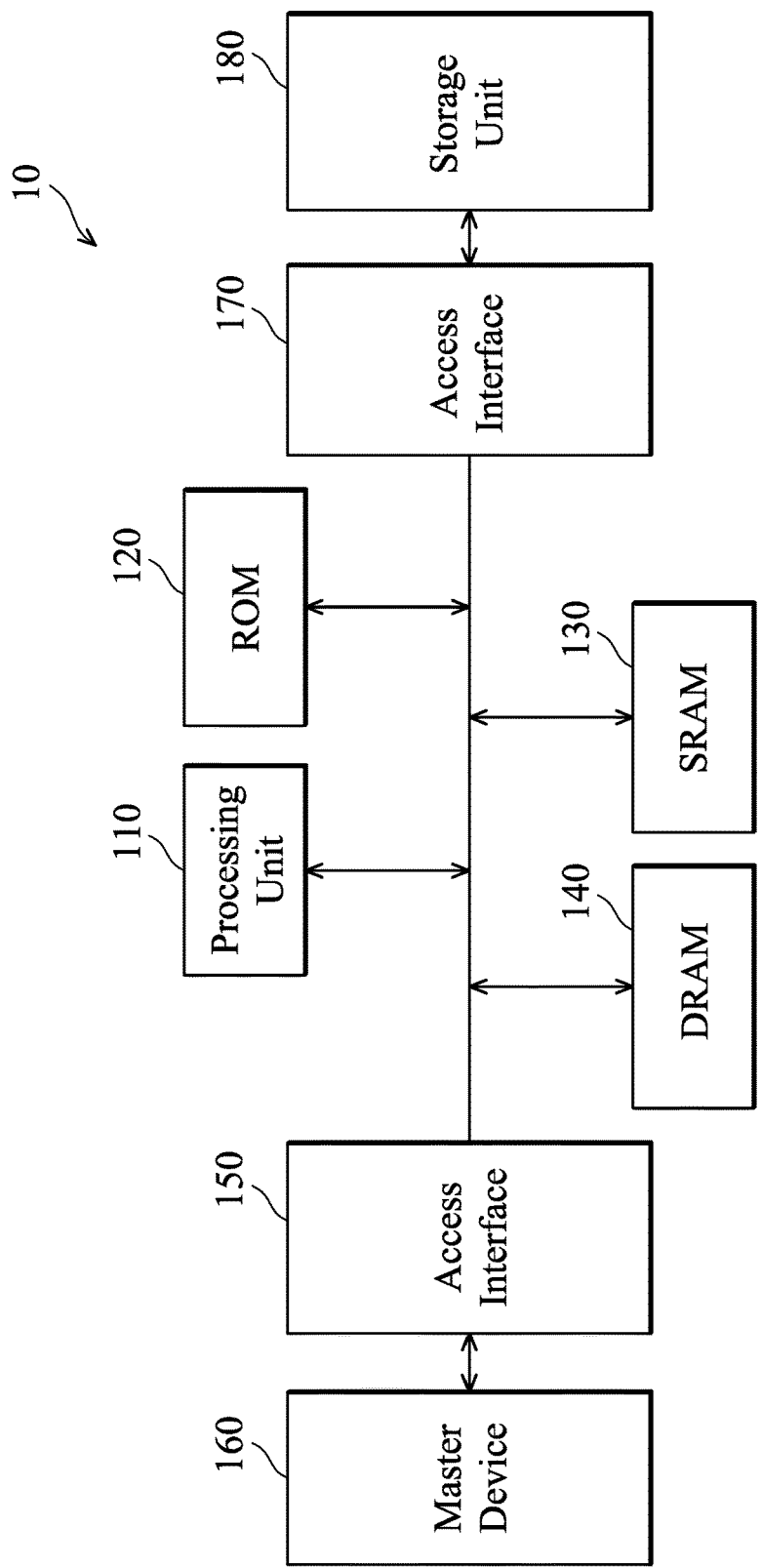
FIG. 1 is the system architecture of an SSD (Solid State Disk) storage system according to an embodiment of the invention.

FIG. 1 is the system architecture of an SSD (Solid State Disk) storage system according to an embodiment of the invention. The system architecture 10 of the SSD storage system contains a ROM (Read Only Memory) to store information regarding a reconfiguration of a storage controller. It should be noted that the information may also be duplicated in a storage unit 180. When executing kernel algorithms of a SRAM (Static Random Access Memory) 130, a processing unit 110 writes data into a designated address of the storage unit 180, and reads data from a designated address thereof. Specifically, the processing unit 110 writes data into a designated address of the storage unit 180 through an access interface 170 and reads data from a designated address through the same interface 170 according to commands issued by a master device 160 via an access interface 150. The system architecture 10 uses several electrical signals for coordinating commands and data transfer between the processing unit 110 and the storage unit 180, including data lines, a clock signal and control lines. The data lines are employed to transfer commands, addresses and data to be written and read. The control lines are utilized to issue control signals, such as CE (Chip Enable), ALE (Address Latch Enable), CLE (Command Latch Enable), WE (Write Enable), etc. The access interface 170 may communicate with the storage unit 180 using a DDR (Double Data Rate) protocol, such as ONFI (open NAND flash interface), DDR toggle, etc. The processing unit 110 may communicate with the master device 160 through the access interface 150 using a standard protocol, such as USB (Universal Serial Bus), ATA (Advanced Technology Attachment), SATA (Serial ATA), PCI-E (Peripheral Component Interconnect Express) etc. The processing unit 110, the ROM 120, the SRAM 130 and the access interfaces 150 and 170 may be referred to collectively as a storage controller.

Figure 2:
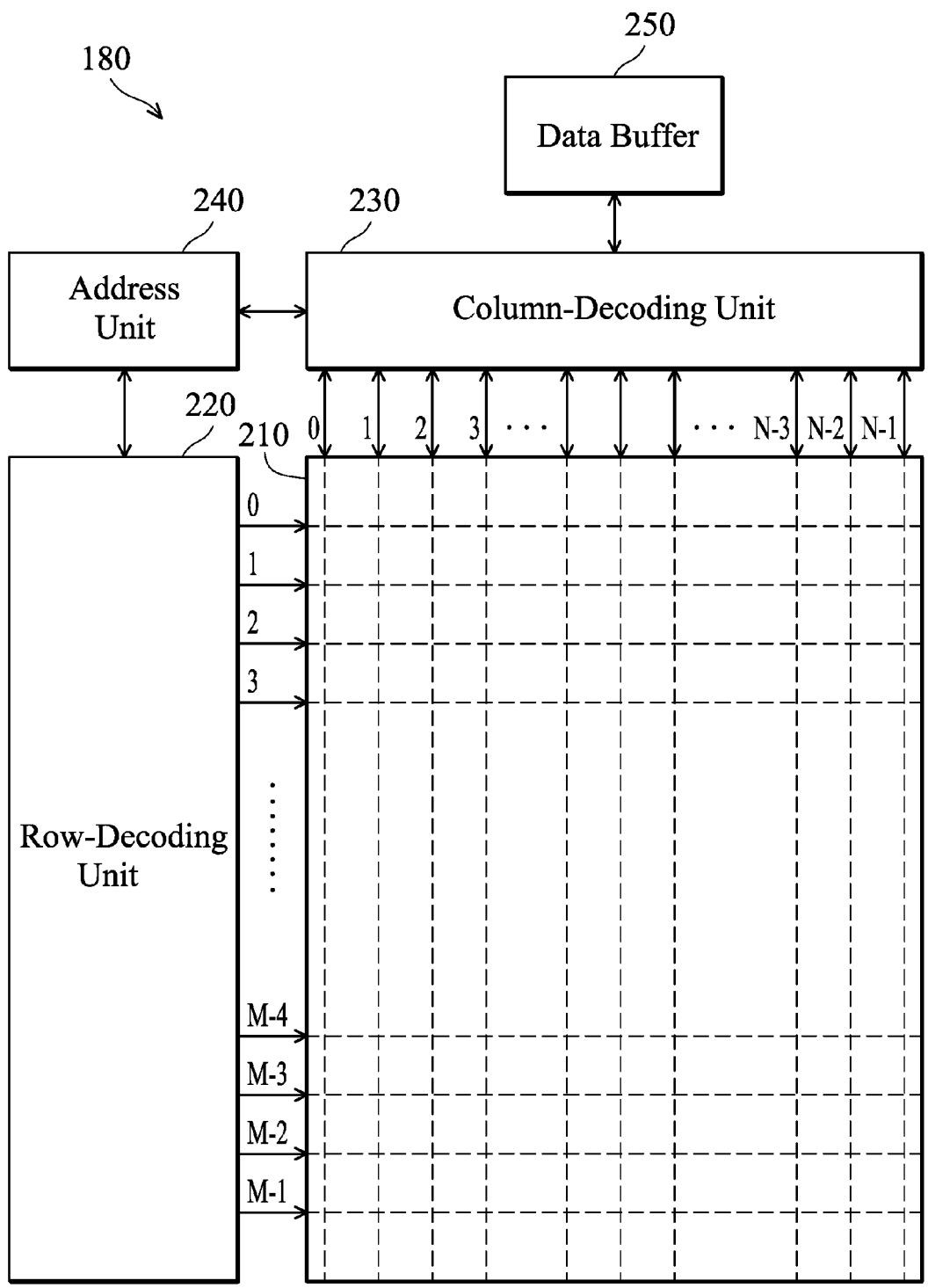
FIG. 2 shows a schematic diagram depicting a storage unit of an SSD storage system according to an embodiment of the invention.

FIG. 2 shows a schematic diagram depicting a storage unit of an SSD storage system according to an embodiment of the invention. The storage unit 180 includes a memory cell array 210 composed of M×N memory cells, and each memory cell may store at least one bit of information. The flash memory may be a NAND flash memory, etc. In order to appropriately access the desired information, a row-decoding unit 220 is used to select appropriate row lines for access. Similarly, a column-decoding unit 230 is employed to select an appropriate number of bytes within the row for output. An address unit 240 applies row information to the row-decoding unit 220 defining which of the N rows of the memory cell array 210 is to be selected for reading or writing. Similarly, the column-decoding unit 230 receives address information defining which one or ones of the M columns of the memory cell array 210 are to be selected. Rows may be referred to as wordlines by those skilled in the art, and columns may be referred to as bitlines. Data read from or to be applied to the memory cell array 210 is stored in a data buffer 250. Memory cells may be SLCs (Single-Level Cells), MLCs (Multi-Level Cells) or TLCs (Triple-Level Cells).

Figure 3:
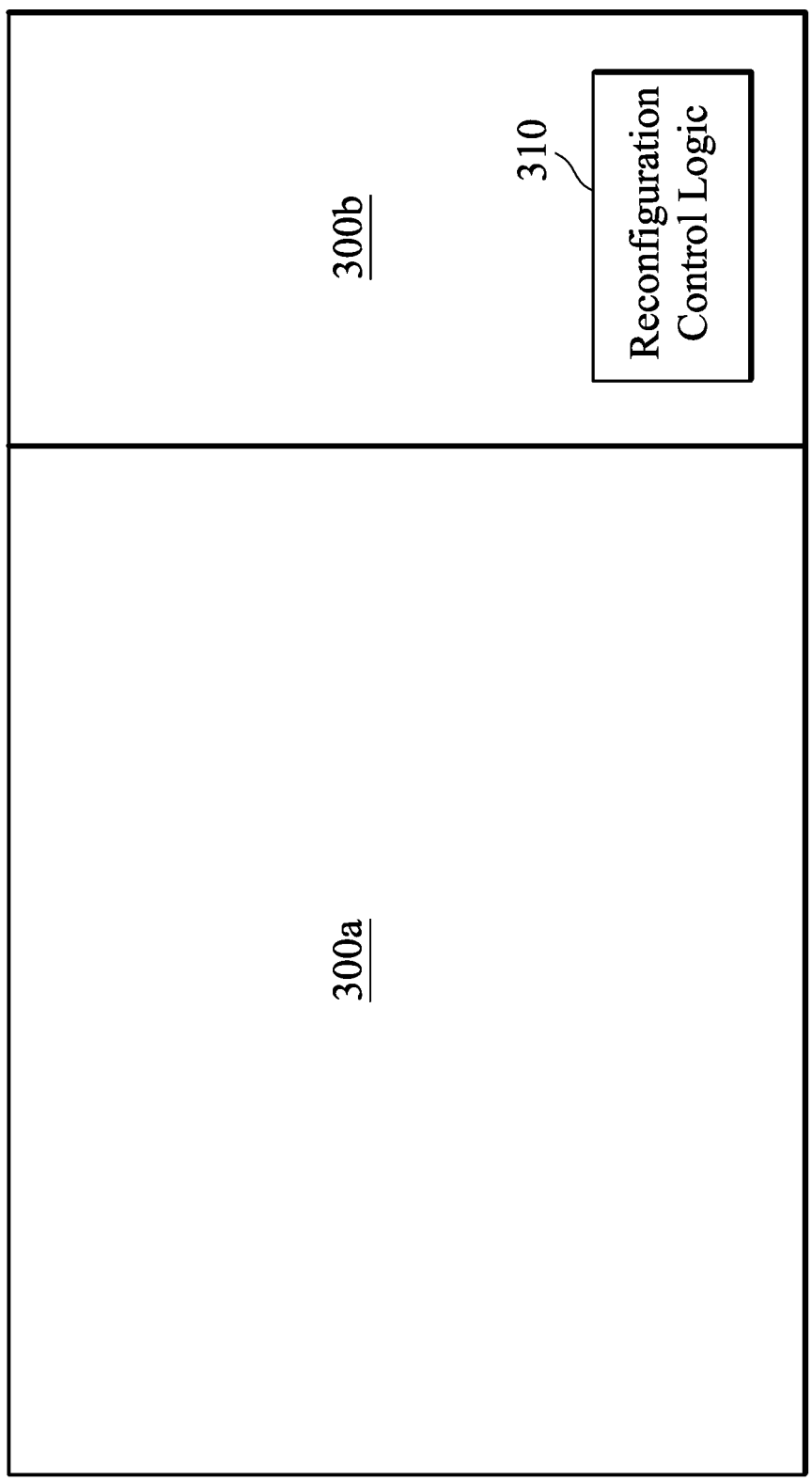
FIG. 3 is a schematic diagram illustrating a logical partition of the storage controller according to an embodiment of the invention.

FIG. 3 is a schematic diagram illustrating a logical partition of the storage controller according to an embodiment of the invention. The storage controller may contain a reconfigurable region 300a and a fixed region 300b. The fixed region 300b may contain I/O control logic, master-device communications logic, reconfiguration control logic 310, and so on. The fixed region 300b may further contain an ALU (Arithmetic Logic Unit) of the processing unit 110 for performing mathematics operations and controlling other devices according to the loaded firmware. For example, the I/O control logic controls I/O devices, such as the ROM 120, the SRAM 130, and so on. The master-device communications logic may be implemented in the access interface 150. Logics of the fixed region 330b cannot be reconfigured. The reconfigurable region 300a is implemented by a FPGA (Field-Programmable Gate Array). The reconfigurable region 300a contains kernel algorithms of the SSD storage system and its occupied space may exceed 90%. The reconfigurable region 300a contains an array of programmable logic blocks, and a hierarchy of reconfigurable interconnects that allow the blocks to be wired together, for example, many logic gates that can be inter-wired in different configurations. Some logic blocks may be configured to perform complex combinational functions, or merely simple logic gates, such as AND, OR, XOR, etc. Some logic blocks may include memory elements, which may be simple flip-flops or complete blocks of memory. The kernel algorithms of the reconfigurable region 300a and the logics of the fixed region 300b may be organized into code segments and each code segment is protected by CRC (Cyclic Redundancy Check) code being added therewith. A decoder may use the CRC codes to determine whether the kernel algorithms and the logics have errors and attempt to correct the errors if happened. However, when the kernel algorithms and the logics cannot be recovered (also referred to as control logic fails), it is needed to perform methods for reconfiguring the storage controller. The control logic failure may also indicate that the storage controller has failed.

Figure 4:
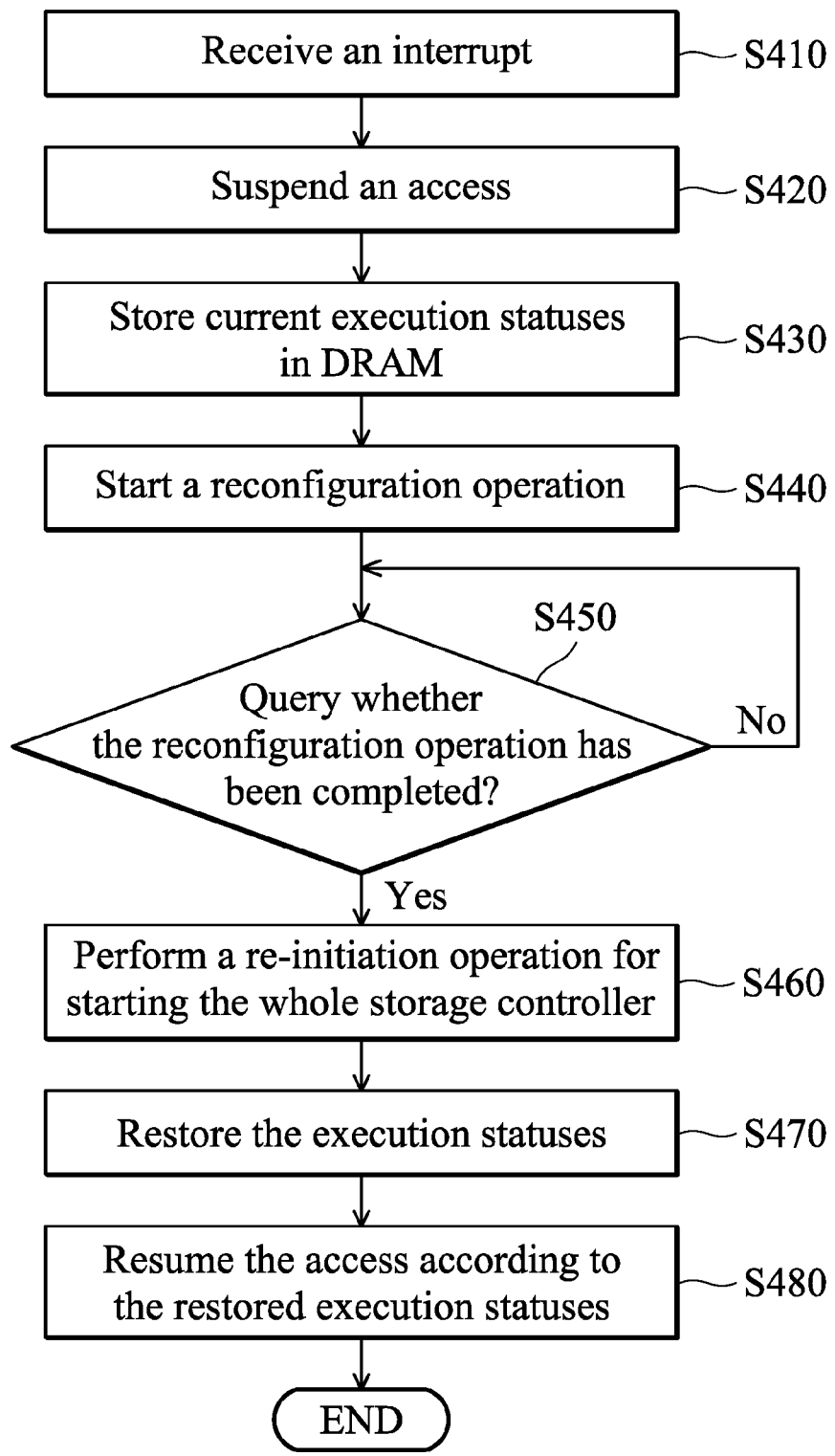
FIG. 4 is a flowchart illustrating a method for reconfiguring a storage controller according to an embodiment of the invention.

In an implementation, the storage controller may inspect which part or parts of the reconfigurable region 300a have irrecoverable errors, and then reconfigure the erroneous part or parts only. In order to perform the inspection, additional hardware and/or software instructions need to be implemented. Alternatively, more time is needed to perform the inspection. However, it may be too late to complete the reconfiguration and the processing for a command issued by the master device 160 before the command expires. In another implementation, the storage controller reconfigures the whole reconfigurable region 300a without the aforementioned inspection. FIG. 4 is a flowchart illustrating a method for reconfiguring a storage controller according to an embodiment of the invention. Those skilled in the art will realize that, after receiving commands from the master device 160, such as data read commands, data write commands, etc., the storage controller employs the kernel algorithms to direct the access interface 170 to complete the received commands. Before the kernel algorithms are employed, the decoder may inspect whether the kernel algorithms and logics are correct. When failing to correct the errors of the kernel algorithms and logics of the storage controller, the decoder issues an interrupt having the highest priority to the processing unit 110. After receiving the interrupt (step S410), the processing unit 110 suspends an access (step S420). In other words, the processing unit 110 does not employ the kernel algorithms having the irrecoverable errors to direct the access interface 170. Next, the current execution statuses (such as variables in execution, data yet to be programmed into the storage unit 180, data which has been read but not been replied to the master device 160, etc.) are stored in the DRAM 140 (step S430). Specifically, in step S430, the processing unit 110 directs the I/O control logic to store the current execution statuses in the DRAM 140. The processing unit 110 directs the reconfiguration control logic 310 to start a reconfiguration operation for reprogramming the whole reconfigurable region 300a (step S440). Specifically, the reconfiguration control logic 310 directs the I/O control logic to read the information in the ROM 120, such as instructions in HDL (Hardware Description Language), a mapping table describing interconnects among logic blocks, etc., and reprograms the whole reconfigurable region 300a according to the information. Next, a loop is repeatedly performed to query whether the reconfiguration operation performed by the reconfiguration control logic 310 has been completed (step S450). After the reconfiguration control logic 310 replies with the completion of the reconfiguration operation to the processing unit 110 (the "Yes" path of step S450), the processing unit 110 performs a re-initiation operation for starting the whole storage controller, thereby enabling the storage controller to be available (step S460). Next, the processing unit 110 restores the execution statuses from the DRAM 140 (step S470) and resumes the access according to the restored execution statuses (step S480). Through the aforementioned method, the unfinished operation can be continued from the point of interruption. The storage controller malfunctions in a short time (shorter than 1 second) and goes back to normal after the reconfiguration operation.

Figure 5:
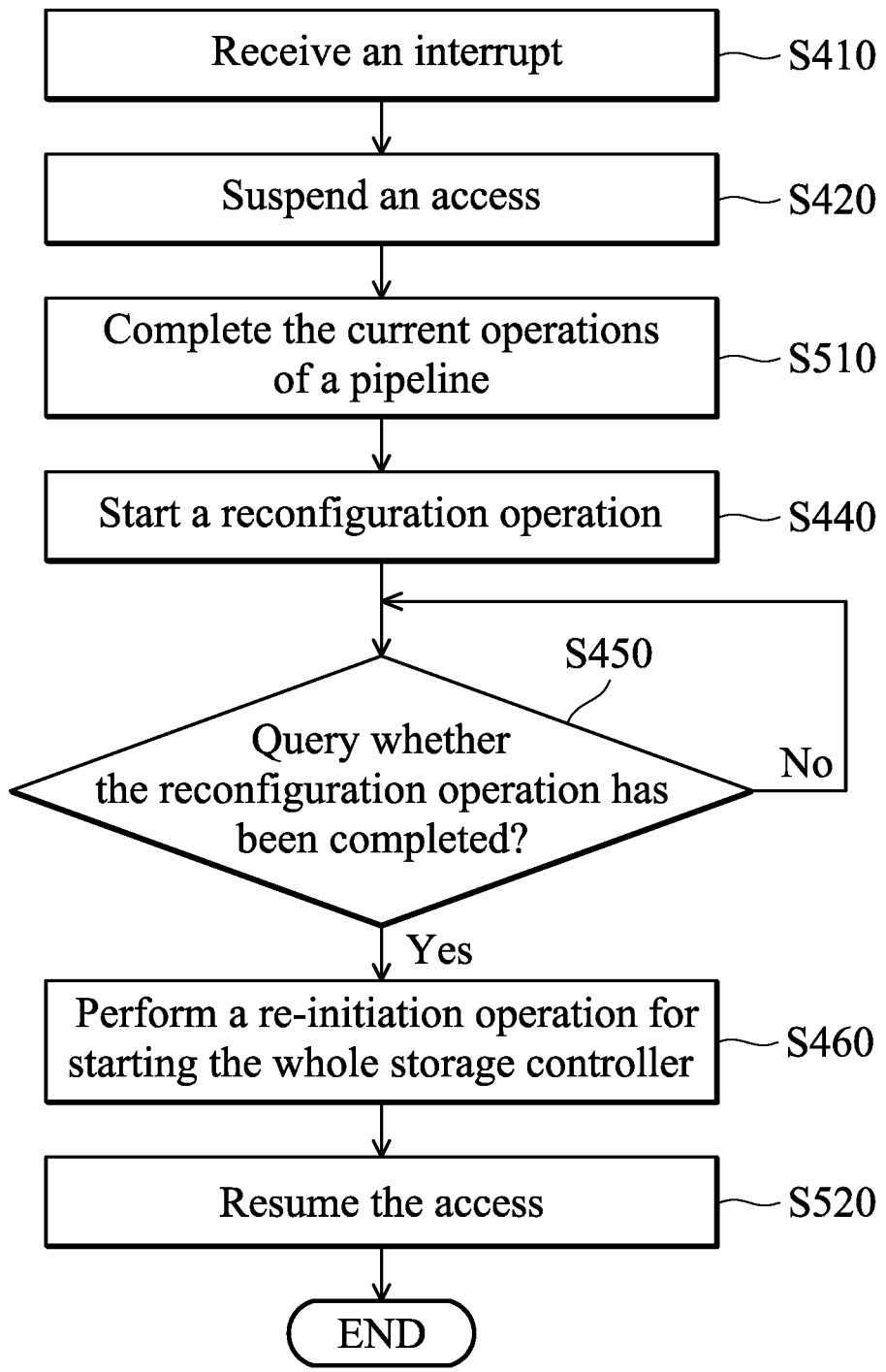
FIG. 5 is a flowchart illustrating a method for reconfiguring a storage controller according to an embodiment of the invention.

FIG. 5 is a flowchart illustrating a method for reconfiguring a storage controller according to an embodiment of the invention. After suspending an access (step S420), the processing unit 110 completes the current operations of the pipeline (step S510). After completing the current operations of the pipeline (step S510), the processing unit 110 directs the reconfiguration control logic 310 to start a reconfiguration operation for reprogramming the whole reconfigurable region 300a (step S440). Next, after performing a re-initiation operation for starting the whole storage controller, thereby enabling the storage controller to be available (step S460), the processing unit 110 resumes the access (step S520). For details of steps S410, S420, S440, S450 and S460, refer to the descriptions of FIG. 4, which are omitted here for brevity.

As to determining whether the storage controller has errors, please refer to the flowcharts illustrated in FIGS. 4 and 5. Some embodiments inspect the SEU (resulting in storage controller fails) via the mechanism of an interrupt handler. Upon receiving an interrupt, the processing unit 110 performs the reconfiguration. In some embodiments, the processing unit 110 periodically polls the decoder if a SEU occurs. Once the decoder replies with indication of an occurrence of the SEU, the processing unit 110 performs the reconfiguration.

Figure 6:
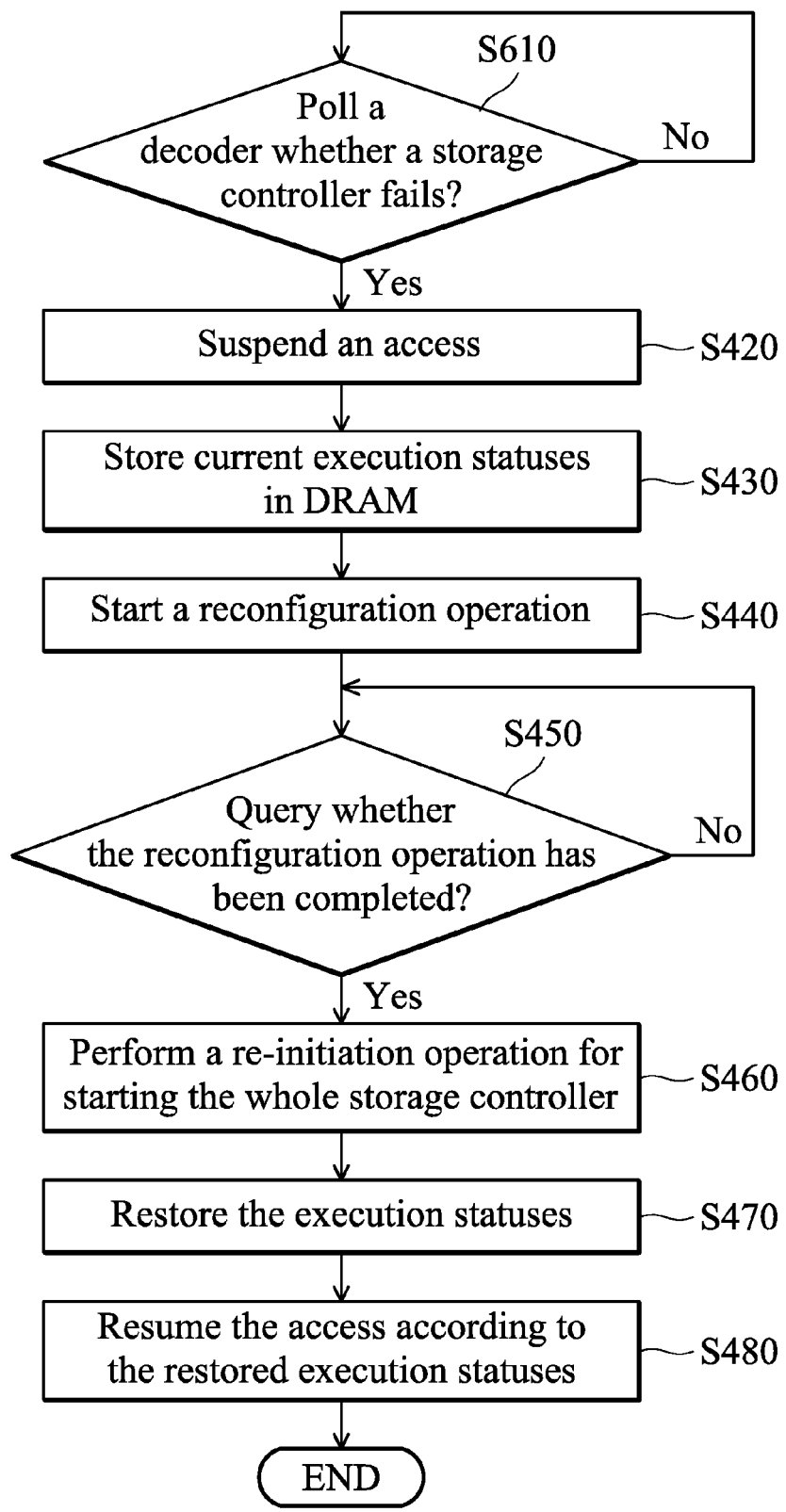
FIG. 6 is a flowchart illustrating a method for reconfiguring a storage controller according to an embodiment of the invention.

FIG. 6 is a flowchart illustrating a method for reconfiguring a storage controller according to an embodiment of the invention. The flowchart of FIG. 6 is similar to FIG. 4. However, those skilled in the art may revise step S410 of FIG. 4 for receiving the interrupt while periodically polling the decoder about whether the storage controller has failed (step S610). When the decoder replies that the storage controller has failed to the processing unit 110 (the "Yes" path of step S610), the processing unit 110 suspends an access (step S420). Refer to the descriptions of FIG. 4 for details about the following steps, which are omitted here for brevity.

Figure 7:
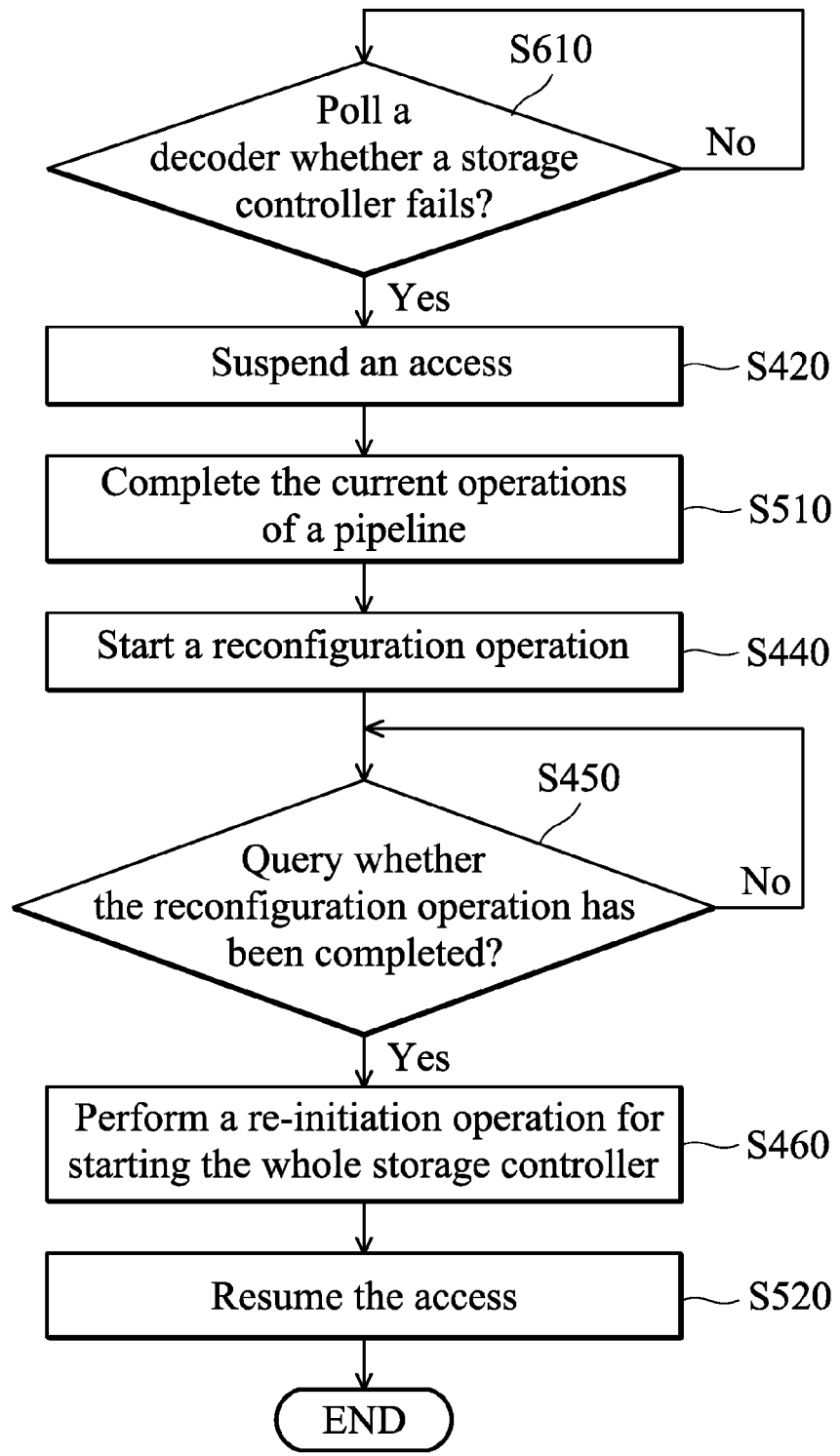
FIG. 7 is a flowchart illustrating a method for reconfiguring a storage controller according to an embodiment of the invention.

FIG. 7 is a flowchart illustrating a method for reconfiguring a storage controller according to an embodiment of the invention. The flowchart of FIG. 7 is similar to FIG. 5. However, those skilled in the art may revise step S410 of FIG. 5 for receiving the interrupt while periodically polling the decoder about whether the storage controller has failed (step S610). When the decoder replies that the storage controller has failed to the processing unit 110 (the "Yes" path of step S610), the processing unit 110 suspends an access (step S420). The following steps may refer to the descriptions of FIG. 5 and are omitted for brevity.

Although the embodiment has been described as having specific elements in FIGS. 1 and 3, it should be noted that additional elements may be included to achieve better performance without departing from the spirit of the invention. While the process flow described in FIGS. 4 to 6 each includes a number of operations that appear to occur in a specific order, it should be apparent that these processes can include more or fewer operations, which can be executed serially or in parallel (e.g., using parallel processors or a multi-threading environment).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for reconfiguring a storage controller of a flash memory when control logic fails, performed by a processing unit, comprising:
   determining that the storage controller has failed;
   suspending an access of the storage controller;
   directing reconfiguration control logic of a fixed region of the storage controller to reprogram a whole reconfigurable region of the storage controller; and
   resuming the access of the storage controller,
   wherein it is determined that the storage controller has failed when kernel algorithms of the reconfigurable region and logics of the fixed region comprise errors that cannot be recovered by a decoder of the flash memory.

2. The method of claim 1, wherein the reconfigurable region is implemented by a FPGA (Field-Programmable Gate Array).

3. The method of claim 1, further comprising:
   before reprogramming the whole reconfigurable region of the storage controller, suspending an access and storing an execution status in a DRAM (Dynamic Random Access Memory); and
   after reprogramming the whole reconfigurable region of the storage controller, performing a re-initiation operation, restoring the execution status from the DRAM and resuming the access according to the execution status.

4. The method of claim 3, wherein the fixed region comprises master-device communications logic for receiving a command for instructing a data access to a storage unit from a master device.

5. The method of claim 3, wherein the step for directing reconfiguration control logic of a fixed region of the storage controller for reprogramming a whole reconfigurable region of the storage controller further comprises:
   periodically querying the reconfiguration control logic about whether a reconfiguration operation has been completed; and
   when the reconfiguration control logic replies that the reconfiguration operation has been completed, proceeding to the subsequent steps.

6. The method of claim 1, wherein the step for directing reconfiguration control logic of a fixed region of the storage controller for reprogramming a whole reconfigurable region of the storage controller further comprises:
   reprogramming the whole reconfigurable region of the storage controller according to information stored in a ROM (Read Only Memory).

7. The method of claim 6, wherein the fixed region comprises I/O control logic and the step for reprogramming the whole reconfigurable region of the storage controller according to information stored in a ROM further comprises:
   directing the I/O control logic to read the information in the ROM.

8. The method of claim 1, wherein the kernel algorithms of the reconfigurable region and the logics of the fixed region are organized into a plurality of code segments and each code segment is protected by CRC (Cyclic Redundancy Check) code being added therewith.

9. The method of claim 8, wherein the decoder uses the CRC codes to determine whether the kernel algorithms and the logics comprise errors, and attempting to correct the errors when this happens.

10. The method of claim 1, wherein the step for determining that a storage controller has failed further comprises:
    receiving an interrupt indicating that the storage controller has failed.

11. The method of claim 10, wherein the interrupt has the highest priority.

12. The method of claim 1, wherein the step for determining that a storage controller has failed further comprises:
    periodically polling the decoder about whether the storage controller has failed; and
    determining that the storage controller has failed when the decoder replies that the storage controller has failed.

13. An apparatus for reconfiguring a storage controller when control logic has failed, comprising:
- a fixed region comprising a processing unit and reconfiguration control logic; and
- a reconfigurable region,
- wherein the processing unit determines that the storage controller has failed; and directs the reconfiguration control logic of the fixed region of the storage controller to reprogram the whole reconfigurable region of the storage controller,
- wherein the processing unit determines that the storage controller has failed when kernel algorithms of the reconfigurable region and logics of the fixed region comprise errors that cannot be recovered by a decoder.

14. The apparatus of claim 13, wherein the reconfigurable region is implemented by a FPGA (Field-Programmable Gate Array).

15. The apparatus of claim 13, wherein the processing unit, before reprogramming the whole reconfigurable region of the storage controller, suspends an access and stores an execution status in a DRAM (Dynamic Random Access Memory); and, after reprogramming the whole reconfigurable region of the storage controller, performs a re-initiation operation, restores the execution status from the DRAM, and resumes the access according to the execution status.

16. The apparatus of claim 15, wherein the fixed region comprises master-device communications logic for receiving a command for instructing a data access to a storage unit from a master device.

17. The apparatus of claim 15, wherein the processing unit periodically queries the reconfiguration control logic about whether a reconfiguration operation has been completed; and, when the reconfiguration control logic replies that the reconfiguration operation has been completed, proceeding to the subsequent operations.

18. The apparatus of claim 13, wherein the processing unit reprograms the whole reconfigurable region of the storage controller according to information stored in a ROM (Read Only Memory).

19. The apparatus of claim 18, wherein the fixed region comprises I/O control logic and the processing unit directs the I/O control logic to read the information in the ROM.

20. The apparatus of claim 13, wherein the kernel algorithms of the reconfigurable region and the logics of the fixed region are organized into a plurality of code segments and each code segment is protected by CRC (Cyclic Redundancy Check) code being added therewith.

21. The apparatus of claim 20, wherein the decoder uses the CRC codes to determine whether the kernel algorithms and the logics comprise errors and attempt to correct the errors when this happens.

22. The apparatus of claim 13, wherein the processing unit determines that the storage controller has failed when receiving an interrupt indicating that the storage controller has failed.

23. The apparatus of claim 22, wherein the interrupt has the highest priority.

24. The apparatus of claim 13, wherein the processing unit periodically polls the decoder about whether the storage controller has failed; and determines that the storage controller has failed when the decoder replies that the storage controller has failed.

* * * * *